Dec. 26, 1933.  N. OKAZAKI  1,940,917
MULTICORE CABLE WITH CRADLE
Filed Aug. 4, 1930
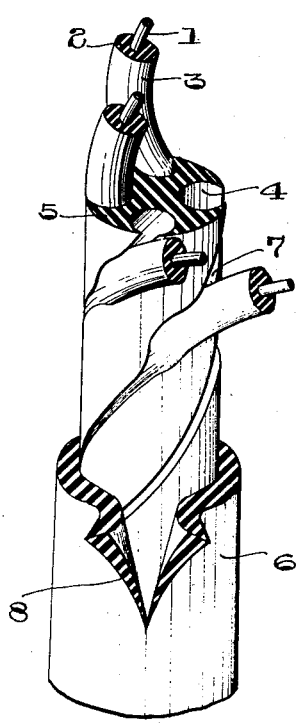
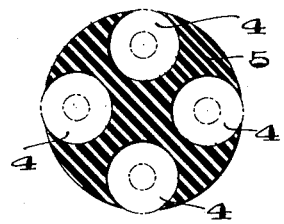
N. Okazaki INVENTOR
By: Marks Clerk Attys.

Patented Dec. 26, 1933

1,940,917

UNITED STATES PATENT OFFICE 1,940,917

MULTICORE CABLE WITH CRADLE

Naotaro Okazaki, Yokohama, Japan, assignor to Furukawa Denkikogyo Kabushiki Kaisha, Tokyo, Japan, a corporation of Japan Application August 4, 1930. Serial No. 472,944

1 Claim. (Cl. 173—264)

This invention relates to improvements in electric cables, and more particularly to a multi-core cable with a cradle. The invention consists in a multiple of cores in a stranded condition encased in a cradle made of a pliable elastic material such as rubber or bitumen and having grooves in which to receive cores, said grooves being arranged spirally along its periphery throughout its length, such cable being sheathed with a tire made of a strong material such as rubber or bitumen, and such cores, cradle and tire sheath being placed close to each other and so constructed as to remain firmly attached to each other or to allow each to be easily separated from the other. The object of the invention is to protect the cores perfectly from the injuries by any external force coming from any direction and tending to crush the cable, by perfectly encasing the cores in the cradle which, combining with the tire to form a single body, readily contracts or expands because of its elasticity in response to the impact or pressure of such external force and thus serves as a perfect buffer for the cores; to maintain a perfect electrical insulation of the cores by keeping each of them completely apart from the other; to make it possible to split one end of the cable to connect it to a terminal and for that purpose to rip open the tire at the part where it lies between the grooves of the cradle without the fear of injuring the cores; and also to enable the cores to be extracted easily from the grooves of the cradle with fingers.

Referring to the accompanying drawing, Fig. 1 shows a partial longitudinal section of a four-core cable with a cradle after the present invention; and Fig. 2, the cross section of the cradle only after the present invention.

In a multi-core cable with the known cradle as shown in Fig. 3, the grooves are so shallow that when the protective sheath is removed, the cradle is unable to completely embrace the cores. In such cable, the limited sheath leaves very narrow space for the cutting instrument when splitting the cable end. The limited area of the surface of the cradle between two adjacent cores, which forms the leakage pass between such cores, entails a comparatively large proportion of leakage. When such cable is pressed by external force, the protective sheath and the cradle are apt to be separated, thus crushing and damaging the core insulations.

In the present invention, the core (1) is sheathed with the rubber or other insulation (2) and four of the cores (3) so constructed are embraced in the cradle (5) made of a rubber compound or a like material and provided with the round grooves (4) arranged spirally along its periphery throughout its entire length in such a way as to enclose said 4 cores in a stranded condition and to keep the peripheries of the cores attached internally to the periphery of the cradle, the whole being armoured with the outer protective sheath (6) made of a rubber compound. The grooves (4) in the cradle (5) having narrow openings (7) along the periphery of the cradle, the cores (3), the cradle (5) and the protective sheath (6), though close to but not firmly fixed to one another, can be easily and perfectly separated one from the other. Further, as the cores (3) are completely embraced in the grooves (4) of the cradle (5), the cradle, combining with the protective sheath (6), protects the cores from injuries by any external force coming from any direction by readily contracting or expanding, owing to its elasticity, in response to such external force and by serving as a perfect buffer for the cores. The cores (3) being completely separated from one another, can maintain a perfect electric insulation. When cutting the protective sheath (6) open between one groove of the cradle and another to split the cable and connect it to a terminal, the operation can be conducted with perfect ease without fear of injuring the cores in any way (3) as shown by the cut opening (8). The cores (3) can be easily extracted from the grooves (4) of the cradle with fingers by utilizing its elasticity, despite the limited width of the openings (7) of the grooves, and such openings will restore their original shape immediately after the cores have been extracted. After the cores have been connected to the terminal when the unnecessary length of the cradle is cut off, the cores (3) can be reinserted into the grooves (4) if necessary and the protective sheath (6) be restored to its original shape to cover the cradle as before. The protective sheath may be made of rubber, bitumen, fibrous material braided and finished with preservative compound, rubber or bitumen with reinforcements 9, rubber or bitumen covered with metallic wires 10, or rubber or bitumen covered with fibrous material braided and finished with preservative compound. In order to increase the flexibility of the cable, each core, before being laid into a groove of the cradle, is coated with suitable lubricating powder to make it slip into the groove easily. In this invention the width of the opening (7) of each groove (4) may be conveniently adjusted within the limit of the diameter of the core (3). The outside of the cradle (5) need not be necessarily circular. It may be multilateral.

Thus the cable after the present invention can be handled conveniently during installation and performs its electrical and mechanical operations quite satisfactorily.

What I claim is:—

A multi-core electric cable comprising a cradle formed from pliable material, a sheathing enclosing the cradle, said cradle having spirally arranged peripheral grooves therein, the entrance opening of the grooves extending spirally around the cradle, cores, having an outside diameter greater than the width of said entrance openings, fitted in the grooves and surrounded by the cradle with the exception of portions which extend into said openings, said cores being passable through the openings by flexure of the walls thereof.

NAOTARO OKAZAKI.